US010982564B2

(12) United States Patent
Weaver et al.

(10) Patent No.: US 10,982,564 B2
(45) Date of Patent: Apr. 20, 2021

(54) APPARATUS AND SYSTEM FOR CERAMIC MATRIX COMPOSITE ATTACHMENT

(71) Applicant: General Electric Company, Schenectady, NY (US)

(72) Inventors: Matthew Mark Weaver, Loveland, OH (US); Michael Alan Hile, Cincinnati, OH (US); Kathleen Elizabeth Albers, Park Hills, KY (US)

(*) Notice: Subject to any disclaimer, the term of this patent is extended or adjusted under 35 U.S.C. 154(b) by 391 days.

(21) Appl. No.: 15/924,501

(22) Filed: Mar. 19, 2018

(65) Prior Publication Data

US 2018/0230857 A1 Aug. 16, 2018

Related U.S. Application Data

(63) Continuation-in-part of application No. 14/569,823, filed on Dec. 15, 2014, now abandoned.

(51) Int. Cl.
*F01D 25/24* (2006.01)
*F01D 9/04* (2006.01)
*F01D 25/00* (2006.01)

(52) U.S. Cl.
CPC ........... *F01D 25/246* (2013.01); *F01D 9/041* (2013.01); *F01D 25/005* (2013.01);
(Continued)

(58) Field of Classification Search
CPC ... F01D 9/02; F01D 9/04; F01D 9/041; F01D 9/042; F01D 11/025; F01D 11/18
See application file for complete search history.

(56) References Cited

U.S. PATENT DOCUMENTS

| 5,580,219 A | 12/1996 | Frey et al. |
| 6,164,903 A * | 12/2000 | Kouris ............ F01D 9/04 415/135 |

(Continued)

FOREIGN PATENT DOCUMENTS

| CN | 101122396 A | 2/2008 |
| CN | 101946080 A | 1/2011 |

(Continued)

OTHER PUBLICATIONS

Translation of WO2013/014367.*
(Continued)

*Primary Examiner* — Ninh H. Nguyen
*Assistant Examiner* — Cameron A Corday

(57) ABSTRACT

An apparatus and system for mechanically connecting components are provided. The apparatus includes a mechanical connecting joint that includes a first joint member formed of a material having a first coefficient of thermal expansion (CTE) value, the first joint member comprising a first sidewall, a second opposite sidewall, and a body extending therebetween. The mechanical connecting joint further includes a second joint member formed of a material having a second CTE value, the second CTE being less than the first CTE. The second joint member includes a first leg facing the first sidewall, a second leg facing the second sidewall, and a connecting member extending between the first leg and the second leg. A first gap is formed between the first joint member and the first leg and a second gap is formed between the first joint member and the second leg.

18 Claims, 7 Drawing Sheets

(52) U.S. Cl.
CPC .... *F05D 2220/323* (2013.01); *F05D 2240/11* (2013.01); *F05D 2240/12* (2013.01); *F05D 2240/14* (2013.01); *F05D 2240/50* (2013.01); *F05D 2300/5021* (2013.01); *F05D 2300/50212* (2013.01); *F05D 2300/6033* (2013.01); *Y02T 50/60* (2013.01)

(56) References Cited

U.S. PATENT DOCUMENTS

| | | | |
|---|---|---|---|
| 6,896,483 | B2 | 5/2005 | Dierksmeier et al. |
| 7,326,030 | B2 | 2/2008 | Albrecht et al. |
| 7,434,670 | B2 | 10/2008 | Good et al. |
| 7,563,071 | B2 | 7/2009 | Campbell et al. |
| 7,581,301 | B2 | 9/2009 | Arbona et al. |
| 7,798,775 | B2 * | 9/2010 | Kammel .............. F01D 5/147 248/205.5 |
| 7,832,972 | B2 | 11/2010 | Jarmon |
| 7,874,059 | B2 | 1/2011 | Morrison et al. |
| 7,967,562 | B2 | 6/2011 | Frost et al. |
| 8,061,977 | B2 | 11/2011 | Keller et al. |
| 8,109,719 | B2 * | 2/2012 | Savage ................. F01D 9/042 29/888.025 |
| 8,556,531 | B1 | 10/2013 | Bird et al. |
| 8,607,577 | B2 | 12/2013 | Ruberte Sanchez et al. |
| 2006/0166015 | A1 | 7/2006 | Spitsberg et al. |
| 2008/0034759 | A1 | 2/2008 | Bulman et al. |
| 2009/0199565 | A1 | 8/2009 | Brown et al. |
| 2010/0054912 | A1 | 3/2010 | Wilson et al. |
| 2012/0301317 | A1 | 11/2012 | Alvanos et al. |
| 2014/0001285 | A1 * | 1/2014 | Grooms, III .......... F01D 11/001 239/265.11 |
| 2014/0023490 | A1 | 1/2014 | Hillier |
| 2014/0147264 | A1 | 5/2014 | Belmonte et al. |
| 2016/0090851 | A1 | 3/2016 | Carr et al. |
| 2016/0333890 | A1 | 11/2016 | Hayford et al. |

FOREIGN PATENT DOCUMENTS

| | | | |
|---|---|---|---|
| EP | 2540994 | A1 | 1/2013 |
| EP | 2543826 | A2 | 1/2013 |
| EP | 2960440 | A1 | 12/2015 |
| GB | 2267541 | A | 12/1993 |
| JP | 2006200037 | A | 8/2006 |
| JP | 2010053863 | A | 3/2010 |
| WO | 2013014367 | A1 | 1/2013 |
| WO | WO-2013014367 | A1 * | 1/2013 ............ F01D 9/042 |
| WO | 2014107217 | A1 | 7/2014 |
| WO | 2014120334 | A1 | 8/2014 |
| WO | 2016059348 | A1 | 4/2016 |

OTHER PUBLICATIONS

European Search Report and Opinion issued in connection with corresponding EP Application No. 15190242.6 dated Jun. 17, 2016.
Unofficial English Translation of Japanese Office Action issued in connection with corresponding JP Application No. 201510663851.9 dated Jan. 26, 2017.

* cited by examiner

APPARATUS AND SYSTEM FOR CERAMIC MATRIX COMPOSITE ATTACHMENT

This application is a Continuation-In-Part of U.S. patent application Ser. No. 14/569,823.

STATEMENT REGARDING FEDERALLY SPONSORED RESEARCH & DEVELOPMENT

The U.S. Government has certain rights in this application as provided for by the terms of Contract No. FA8650-09-D-2922.

BACKGROUND

This description relates to component connection assemblies, and, more particularly, to a component connection assembly that includes materials having different coefficients of thermal expansion (CTE).

At least some known applications of coupling components formed of ceramic matrix composite material (CMC) to components formed of metal in high temperature environments because there typically is a difference in CTE between the two materials. Typically, a clamping load applied to CMC between two pieces of metal will be decreased as the component reaches its high temperature operating condition and the metal grows faster and to a greater degree than the CMC. This loss in clamping load is almost always unacceptable and difficult to overcome in design.

The attachment of load bearing CMC component elements has been attempted with bolted joints that include spring elements to maintain clamping load at elevated temperatures. High CTE materials such as A-286 have been used as spacers to compensate for the low CTE of the CMC. Non-cantilevered nozzles and shrouds have also used pin elements to limited success.

BRIEF DESCRIPTION

In one embodiment, a mechanical connecting joint includes a first joint member formed of a material having a first coefficient of thermal expansion (CTE) value, the first joint member comprising a first sidewall, a second opposite sidewall, and a body extending therebetween. The mechanical connecting joint further includes a second joint member formed of a material having a second CTE value, the second CTE being less than the first CTE. The second joint member includes a first leg facing the first sidewall, a second leg facing the second sidewall, and a connecting member extending between the first leg and the second leg. A first gap is formed between the first joint member and the first leg and a second gap is formed between the first joint member and the second leg.

In another embodiment, a vane attachment assembly includes a plurality of airfoil vane shanks extending from a vane platform, each of the airfoil shanks comprising a ceramic matrix composite material (CMC) having a first coefficient of thermal expansion (CTE). The airfoil attachment assembly also includes a vane hanger formed of a metal material having a second CTE, the airfoil hanger positioned between adjacent ones of the plurality of airfoil vane shanks, a surface of the airfoil hanger configured to expand outwardly towards the adjacent ones of the plurality of airfoil vane shanks thereby exerting a force into the adjacent ones of the plurality of airfoil vane shanks.

In another embodiment, a gas turbine engine assembly includes a casing, a plurality of bearings and a rotatable member including an axis of rotation and supported within the casing by the plurality of bearings. A vane hanger includes a metal material having a first coefficient of thermal expansion (CTE), the vane hanger being positioned radially outward from the rotatable member within the casing. The vane hanger includes a radially outer portion coupled to the casing and a radially inner portion including a vane attachment. A vane includes a radially outer shank portion which includes a first leg and a second leg, the first and second legs extending radially outwardly on opposite sides of the vane attachment. The first and second legs include a ceramic matrix composite (CMC) material having a second CTE. The radially outer shank portion includes a slot allowing for thermal expansion in a direction along a length of the radially outer shank portion. The vane attachment, the first leg and the second leg are angled such that their respective lengths are oriented at least partially in a circumferential direction and at least partially in an axial direction.

In another embodiment, a gas turbine engine assembly includes a casing, a plurality of bearings, an upstream rotatable turbine stage supported within the casing by the plurality of bearings, and a downstream rotatable turbine stage supported within the casing by the plurality of bearings. A vane hanger includes a metal material having a first coefficient of thermal expansion (CTE), the vane hanger being positioned radially outward from the rotatable member within the casing. The vane hanger includes a radially outer portion coupled to the casing and a radially inner portion including a vane attachment. A vane includes a radially outer shank portion which includes a first leg and a second leg, the first and second legs extending radially outwardly on opposite sides of the vane attachment. The first and second legs include a ceramic matrix composite (CMC) material having a second CTE. An upstream shroud hanger is located radially outward of an upstream shroud, the upstream shroud hanger being mechanically attached to an axially forward portion of the vane hanger. A downstream shroud hanger is located radially outward of a downstream shroud, the downstream shroud hanger being mechanically attached to an axially aft portion of the vane hanger.

In another embodiment, a gas turbine engine assembly includes a casing, and a plurality of bearings. A vane hanger includes a metal material having a first coefficient of thermal expansion (CTE), the vane hanger being positioned radially outward from the rotatable member within the casing. The vane hanger includes a radially outer portion coupled to the casing and a radially inner portion including a vane attachment. An upstream hanger mechanically attaches to a forward portion of the vane hanger. A downstream hanger mechanically attaches to an aft portion of the vane hanger. A vane includes a radially outer shank portion which includes a first leg and a second leg, the first and second legs extending radially outwardly on opposite sides of the vane attachment. The first and second legs include a ceramic matrix composite (CMC) material having a second CTE. The vane attachment, the first leg and the second leg are angled such that their respective lengths are oriented at least partially in a circumferential direction and at least partially in an axial direction.

In yet another embodiment, a gas turbine engine assembly includes a rotatable member comprising an axis of rotation and supported within a casing by a plurality of bearings. The gas turbine engine assembly also includes a vane hanger comprising a metal material having a first coefficient of thermal expansion (CTE) positioned radially outward from the rotatable member within the casing, the airfoil hanger comprising a radially outer portion fixedly coupled to the casing and a radially inner portion comprising a vane attachment. The gas turbine engine assembly further includes a vane comprising a radially outer shank portion comprising a first leg and a second leg, each of the first and second legs extending radially outwardly on opposite sides of the airfoil attachment, each of the first and second legs comprising a ceramic matrix composite (CMC) material having a second CTE.

BRIEF DESCRIPTION OF THE DRAWINGS

FIG. 1 is a cross-sectional schematic illustration of an exemplary gas turbine engine assembly having a longitudinal axis.

FIG. 2 is a cross-section of a portion of gas turbine engine assembly shown in FIG. 1 in accordance with an example embodiment of the present disclosure.

FIG. 3 is a radially inwardly looking view of a portion of gas turbine engine assembly shown in FIG. 1 in accordance with an example embodiment of the present disclosure.

FIG. 4 is a radially inwardly looking view of the portion of the gas turbine engine assembly shown in FIG. 1 in accordance with another embodiment of the present disclosure.

FIG. 5 is a side elevation view of a mechanical connecting joint in accordance with an example embodiment of the present disclosure.

FIG. 6 is a plan view of a mechanical connecting joint in accordance with another example embodiment of the present disclosure.

FIG. 7 is a perspective view of a cantilevered solid doublet CMC vane including the vane hanger and shank shown in FIG. 2.

FIG. 8 is a perspective view cantilevered solid doublet CMC vane showing only the CMC parts.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of joining components having a high CTE with components having a low CTE in industrial, commercial, and residential applications.

Embodiments of the present disclosure describe an attachment configuration for joining two components, for example, a Ceramic Matrix Composite (CMC) vane to a metal airfoil hanger. Although described herein in terms of a cantilevered solid doublet CMC vane, the attachment configuration should be understood to be applicable for any CMC to metal component joint applied to other CMC vanes and structures. As described herein, a metallic hanger is fitted between and pinned to the two CMC vane mounting shanks that extend from the airfoils as continuous plies through the outer end wall. The metallic pins and hanger are fitted with the CMC such that the desired clamping load is achieved as the metal out grows the CMC at operating temperature. The same attachment configuration can be used to mount the metallic inner mid-seal box between vane shanks extending through the inner flow path end wall.

Metallic components being attached to the CMC vane are configured so that they are constrained between or inside the CMC. It therefore uses the difference in coefficient of thermal expansion (CTE) between the CMC and metal to increase the clamping load between the parts at elevated operating temperatures rather than decrease it. For example, in a connection of a cantilevered CMC doublet vane including solid airfoils and integral CMC flow path end walls, a metallic hanger is fitted between and pinned to the two CMC vane mounting shanks. The metallic hanger is fitted between the CMC vane shanks such that the desired clamping load is achieved as the metal out grows the CMC at operating temperature. Likewise, the metallic pin (or shoulder bolt) to CMC hole is sized so that the desired fit is achieved at operating temperature.

The following description refers to the accompanying drawings, in which, in the absence of a contrary representation, the same numbers in different drawings represent similar elements.

Figure 1:
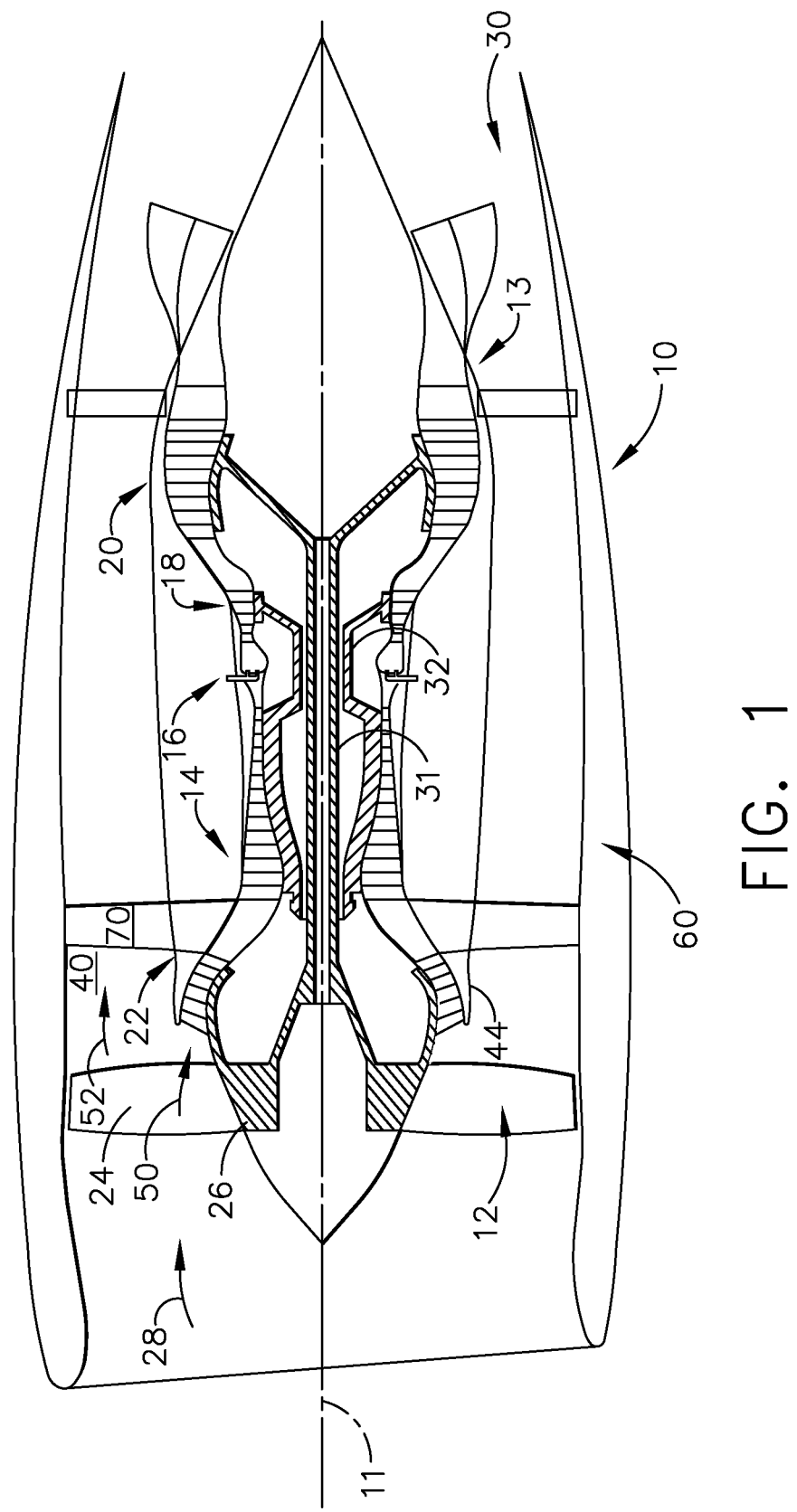
FIGS. 1-8 show example embodiments of the method and apparatus described herein.

FIG. 1 is a cross-sectional schematic illustration of an exemplary gas turbine engine assembly 10 having a longitudinal axis 11. Gas turbine engine assembly 10 includes a fan assembly 12 and a core gas turbine engine 13. Core gas turbine engine 13 includes a high-pressure compressor 14, a combustor 16, and a high-pressure turbine 18. In the exemplary embodiment, gas turbine engine assembly 10 also includes a low-pressure turbine 20, and a multi-stage booster compressor 22, and a splitter 44 that substantially circumscribes booster 22.

Fan assembly 12 includes an array of fan blades 24 extending radially outward from a rotor disk 26. Gas turbine engine assembly 10 has an intake side 28 and an exhaust side 30. Fan assembly 12, booster 22, and turbine 20 are coupled together by a first rotor shaft 31, and compressor 14 and turbine 18 are coupled together by a second rotor shaft 32. In the exemplary embodiment, engine assembly 10 may be, but is not limited to being, a LEAP or Passport 20 gas turbine engine available from General Electric Company, Cincinnati, Ohio.

In operation, air flows through fan assembly 12 and a first portion 50 of the airflow is channeled through booster 22. The compressed air that is discharged from booster 22 is channeled through compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Gas turbine engine assembly 10 is operable at a range of operating conditions between design operating conditions and off-design operating conditions.

A second portion 52 of the airflow discharged from fan assembly 12 is channeled through a bypass duct 40 to bypass a portion of the airflow from fan assembly 12 around the core gas turbine engine 13. More specifically, bypass duct 40 extends between a fan casing 42 and splitter 44. Accordingly, a first portion 50 of the airflow from fan assembly 12 is channeled through booster 22 and then into compressor 14 as described above and a second portion 52 of the airflow from fan assembly 12 is channeled through bypass duct 40 to provide thrust for an aircraft, for example. Gas turbine engine assembly 10 also includes a fan frame assembly 60 to provide structural support for fan assembly 12 and is also utilized to couple fan assembly 12 to core gas turbine engine 13.

Fan frame assembly 60 includes a plurality of outlet guide vanes 70 that typically extend substantially radially, between a radially-outer mounting flange and a radially-inner mounting flange, and are circumferentially-spaced within bypass duct 40. Guide vanes 70 serve to turn the airflow downstream from rotating blades such as fan blades 24.

Figure 2:
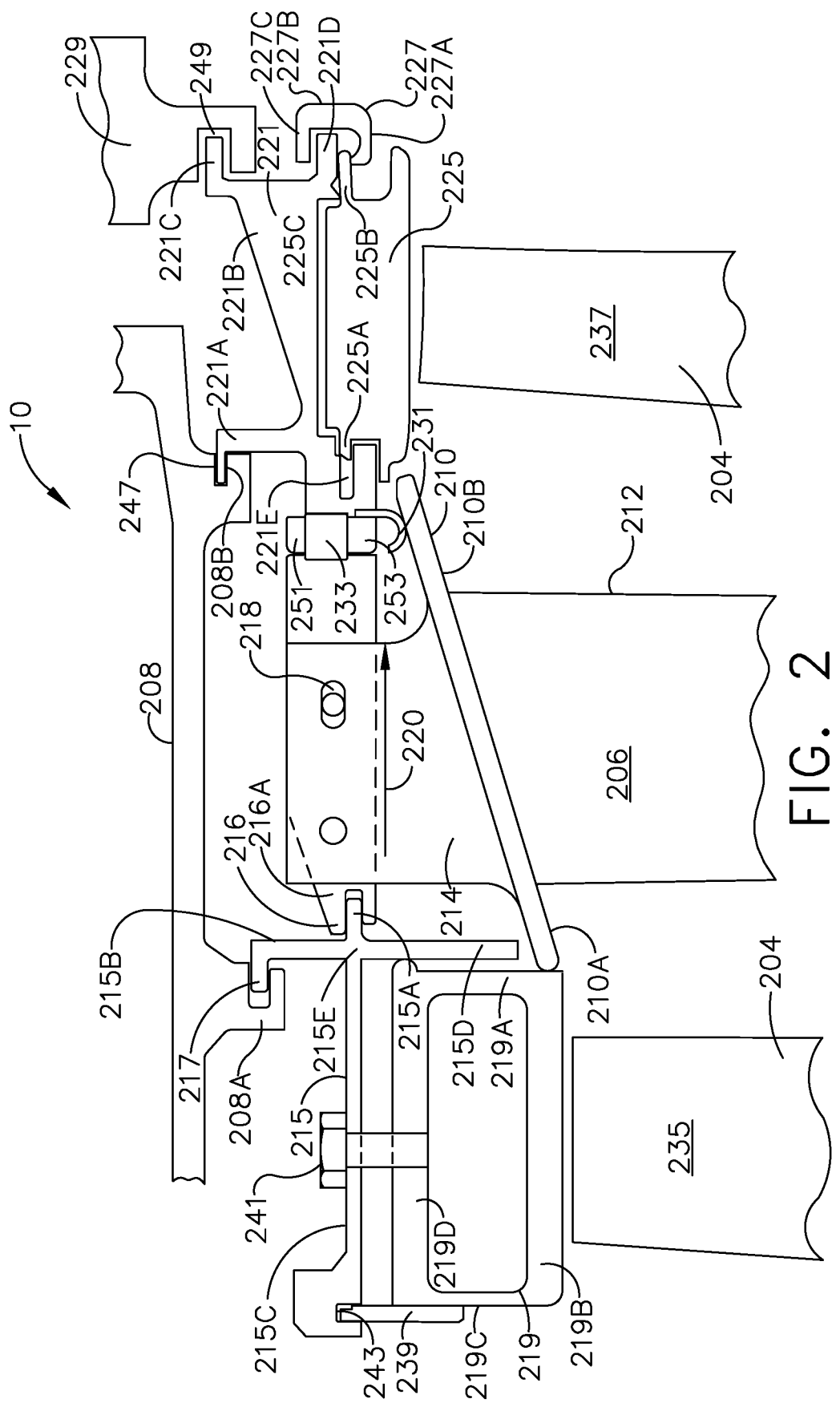

FIG. 2 is a cross-section of a portion of gas turbine engine assembly 10 (shown in FIG. 1) in accordance with an example embodiment of the present disclosure. In the example embodiment, a rotatable member (not shown) includes a plurality of radially outwardly extending blades 204. Blades 204 are interdigitated with stationary vanes 206 that extend radially inwardly from a casing 208 circumscribing rotatable member (not shown). Stationary vane 206 includes a platform 210, an airfoil 212 extending radially inwardly from platform 210, and a shank 214 extending radially outwardly from platform 210. Stationary vane 206 is coupled to casing 208 via a metal vane hanger 216. A slot 218 in CMC vane shank 214 allows for differential growth along a length 220 of shank 214.

Forward hanger 215 extends axially forward from vane hanger 216. The cross section of forward hanger 215 has four arms 215A-215D extending from joint 215E. A first hanger arm 215A extends axially aft from joint 215E to interface with an axially forwardly open first slot 216A, located at an axially forward portion of hanger 216. The first hanger arm 215A inserts into first slot 216A to radially locate forward hanger 215. A second hanger arm 215B extends radially outwardly and intersects with an axially forward extending first lip 217. The first lip 217 inserts into an axially aft open second slot 208A to radially support forward hanger 215. The second slot 208A is located at an axially forward location of case 208. Forward hanger 215 is also an upstream hanger 215 because it is located at an axial location on the gas turbine engine that is upstream from vane hanger 216.

A third hanger arm 215C extends axially forward from joint 215E. The third hanger arm 215C is radially outward from a forward box shroud 219. The forward box shroud 219 corresponds to an upstream turbine rotor stage 235 and is located radially outward from the upstream turbine rotor stage 235. The third hanger arm 215C terminates at an axially forward end with a third slot 243 which is open in a radially inward direction. The third slot 243 receives tab 239 which extends in a radial direction and interfaces with an axially forward wall 219C of forward box shroud 219. Through the interface with the axially forward wall 219C, the tab 239 axially locates the forward box shroud 219. Other positioning structures such as, but not limited to, tangs, arms, springs, bolts and hangers are also possible in addition to tab 243 for axially positioning forward box shroud 219.

Forward box shroud 219 includes four walls 219A-219D which form a rectangular cross-section of the forward box shroud 219, including a hollow interior. The rectangular cross-section of forward box shroud 219 is translated 360 degrees around a turbine gas path annulus in a circumferential direction, forming the periphery or boundary of the turbine gas path. As such, forward box shroud 219 is curvilinear in the circumferential direction while the cross section of the forward box shroud is substantially rectangular.

Each of the four forward hanger arms 215A-215D is similarly translated 360 degrees around the turbine gas path annulus. As such, each of the four forward hanger arms 215A-215D appear as "arms" or substantially one-dimensional linkages in the cross-sectional view of FIG. 2. The four forward hanger arms 215A-215D appear as two-dimensional, curvilinear surfaces when viewed in three-dimensions. As used herein, the term curvilinear refers to non-linear, curved surfaces or lines where the curvature is smooth and constant. Stated otherwise, a curvilinear surface as used herein does not have varying curvature and generally has curvature in only a single direction, being linear in the other directions.

An attachment 241 inserts in a radially inward direction through the hangar third arm 215C and attaches to a radially outer wall 219D of forward box shroud 219. The attachment 241 radially supports forward box shroud 219 and attaches box shroud to the casing 208 via forward hanger 215. Attachments for radially supporting forward box shroud 219 and connecting it to the forward hanger 215 can be formed by appropriate structures such as, but not limited to, a bolt, dowel, tie rod, pin, clamp and/or any other suitable attachment means.

Still referring to FIG. 2, a fourth hanger arm 215D extends radially inward from joint 215E. Each of the four hanger arms 215A-215D intersect at joint 215E at a 90-degree angle with the adjacent hanger arms 215A-215D. An axially forward face of the fourth hanger arm 215D contacts an axially aft wall 219A of the forward box shroud 219 and positions the forward box shroud axially. The fourth hanger arm 215D terminates at a radially inward end in the vicinity of an axially forward portion 210A of platform 210, forming a radial gap 245 such that the radially inward end of the fourth hanger arm 215D is spaced radially outward from the axially forward portion 210A of platform 210. In operation, purge flow (i.e., hot air) flows through radial gap 245.

Aft hanger 221 extends in an axially aft direction from hanger 216. A first aft hanger arm 221A extends radially outward and intersects with an axially forward extending lip 247 which interfaces with a fourth slot 208B located in an aft portion of casing 208. The forwardly extending lip 247 inserts into the fourth slot 208B to provide radial support to aft hanger 221. A second aft hanger arm 221B extends axially aft with an increasing thickness connecting with a third and fourth aft hanger arms 221C and 221D, respectively. The third aft hanger arm 221C is located radially outward of the fourth aft hanger arm 221D at a radially aft portion of aft hanger 221. The third aft hanger arm 221C inserts into a fifth slot 249 located in a rear or aft portion 229 that is mechanically coupled to engine casing 208. The fifth slot 249 is open in an axially forward direction for receiving the axially aft extending third aft hanger arm 221C, thereby providing radial support to aft hanger 221. Aft hanger 221 is also a downstream hanger 221 because it is is located at an axial location on the gas turbine engine that is downstream of vane hanger 216.

Aft hanger 221 is radially outward of aft turbine shroud 225, which itself is radially outward from an aft turbine rotor stage 237. Turbine rotor stage 237 and aft turbine shroud 225 are axially aft or downstream from stationary vane 206 and vane hanger 216 respectively. Similar to forward box shroud 219, aft turbine shroud 225 is translated 360 degrees around the turbine gas path annulus in a circumferential direction, forming the periphery or boundary of the aft turbine gas path. An axially forward lip 225A of the aft turbine shroud 225 inserts into a sixth slot 221E, which is integrated into aft hanger 221. Via the inserted axially forward lip 225A of the aft turbine shroud 225, the sixth slot 221E is open in an axially aft direction and radially supports aft turbine shroud 225.

A radially outboard shoulder 225C on aft turbine shroud 225, axially forward of lip 225B, interfaces with hanger 221 just forward of arm 221D to provide axial location. An axially aft extending lip 225B, located in an axially aft portion of aft turbine shroud 225, interfaces with bracket 227. As illustrated in FIG. 2, bracket 227 is C-shaped and includes a first axially forward extending arm 227A which connect at a 90-degree angle to a central radially outward extending arm 227B which connects at a 90-degree angle to a second axially forward extending arm 227C located radially outward and substantially parallel to the first axially extending bracket arm 227A. The first axially forward extending arm 227A of bracket 227 provides radial support to the axially aft extending lip 225B of turbine shroud 225 while a fourth aft hanger arm 221D, located in an aft portion of aft hanger 221 provides radial support to the second axially forward extending arm 227C. In this embodiment, the aft hanger 221 provides radial support to aft turbine shroud 225 via the C-shaped bracket 227.

Still referring to FIG. 2, hanger 216 includes a circumferentially extending hook 251 which interfaces with an oppositely circumferentially extending shiplap 233 of an adjacent hanger 216 spaced circumferentially from hanger 216. Shiplap 233 inserts radially inward of hook 251 causing adjacent interfacing hangers 216 to be radially located. Aft hanger 221 includes an axially forward extending lug 253 which inserts radially inward of hook 251, thereby radially and circumferentially locating hanger 216. The aft surface of hanger 216 abuts with the forward face of hanger 221 to provide the axial location of hanger 216. Radially inward from lug 253 is a J-shaped seal 231, which acts as a flow discourager. The J-shaped seal 231 contacts an axially aft portion 210B of platform 210 thereby reducing airflow in the radial space between axially aft portion 210B of platform 210 and hanger 216. The J-shaped seal 231 axially held in position via a top portion of the J-shaped seal 231 that is inserted radially upwardly at the interface of the axially forward extending lug 253 and the shiplap 233. Other shaped seals 231 are also possible including cylindrical or "rope seals," substantially planar seals, semi-circular seals, elliptical seals, as well as any other suitable shape.

Figure 3:
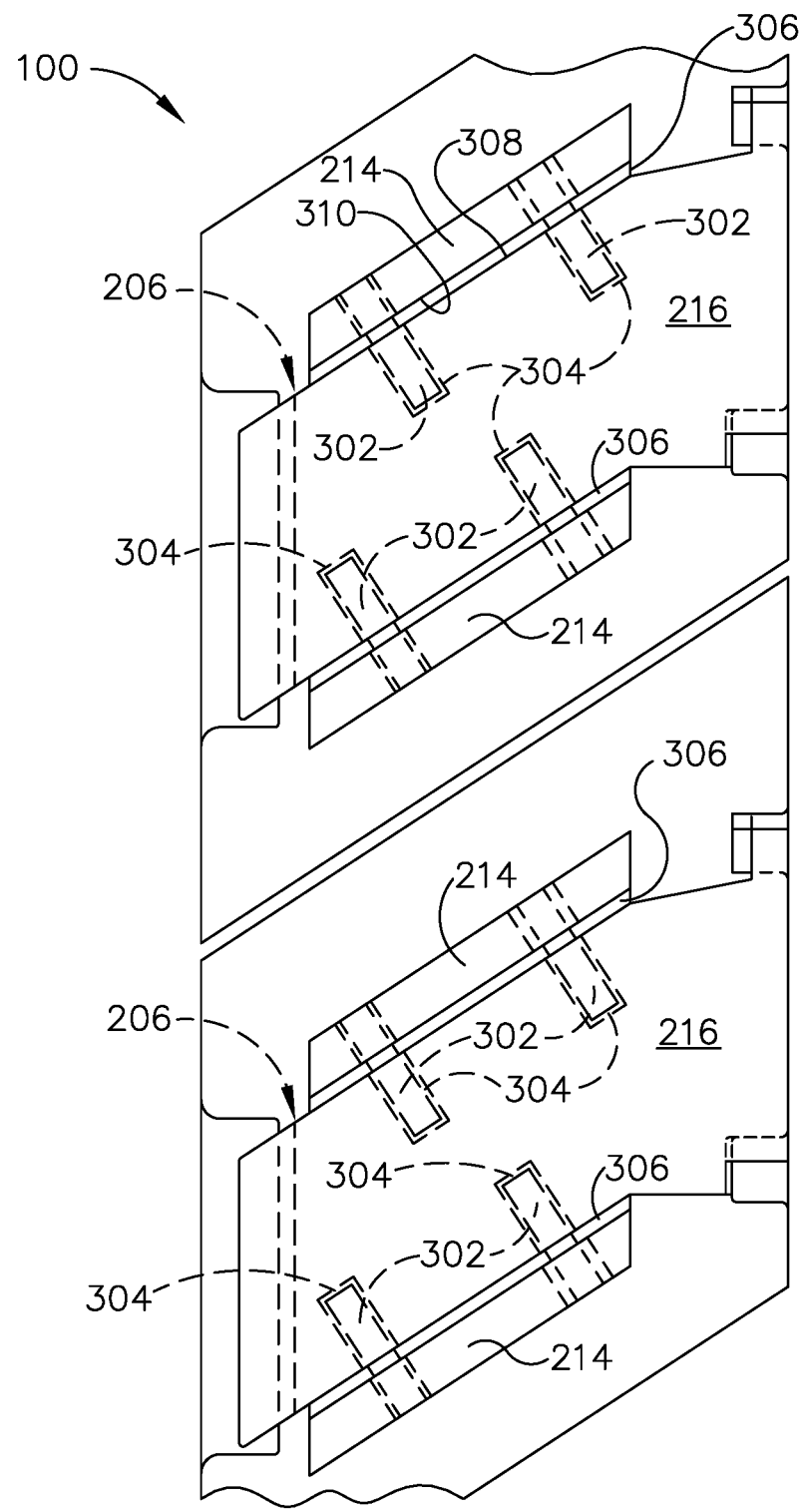

FIG. 3 is a radially inwardly looking view of a portion of gas turbine engine assembly 10 (shown in FIG. 1) in accordance with an example embodiment of the present disclosure. In the example embodiment, vane 206 is formed of a ceramic matrix composite (CMC) material having a first coefficient of thermal expansion (CTE). The only part of vane 206 that is visible in FIG. 3 is shank 214. Vane 206 exceeds into the page obscured by vane hanger 216. One or more locating or drift pins 302 extend from within shank 214 into vane hanger 216. Pins 302 may fit loosely into a respective bore 304 in each of shank 214 and may expand at operating temperature to a tight fit within bore 304 of shank 214. In various embodiments, a gap 306 is formed between shank 214 and vane hanger 216. Gap 306 permits easy installation during an assembly process. When gas turbine engine assembly 10 (shown in FIG. 1) heats up during startup, gap 306 is reduced. In one embodiment gap 306 is reduced to approximately zero distance, meaning that a surface 308 of vane hanger 216 bears directly on a surface 310 of shank 214 and/or vane hanger 216. Because vane hanger 216 expands at a different rate than shank 214 because of a difference of CTE of the different materials of which shank 214 and vane hanger 216 are formed, vane hanger 216 expands to take up gap 306, touches shank 214 and applies a force against shank 214. The force is predetermined based on dimensions of shank 214 and vane hanger 216, their respective CTEs, and an expected operating temperature of gas turbine engine assembly 10 (shown in FIG. 1).

The interface between shank 214 and hanger 216 is oriented at an angle such that the contact between mating surfaces of shank 214 and hanger 216 is neither entirely axial nor entirely circumferential but instead includes a component in both the axial and circumferential directions. Stated otherwise, and as illustrated in both FIGS. 3 and 4, the interface between shank 214 and hanger 216 is angled to include both circumferential and axial components. In a preferred embodiment, the interface between shank 214 and hanger 216 is angled to be at approximately 45 degrees. In a second preferred embodiment, the interface between shank 214 and hanger 216 is angled at less than 45 degrees such that the interface is closer being oriented in an axially direction than to a circumferential direction. Hanger 216 extends axially forward of shank 214, as illustrated in FIGS. 2, 3, 4 and 7.

Figure 4:
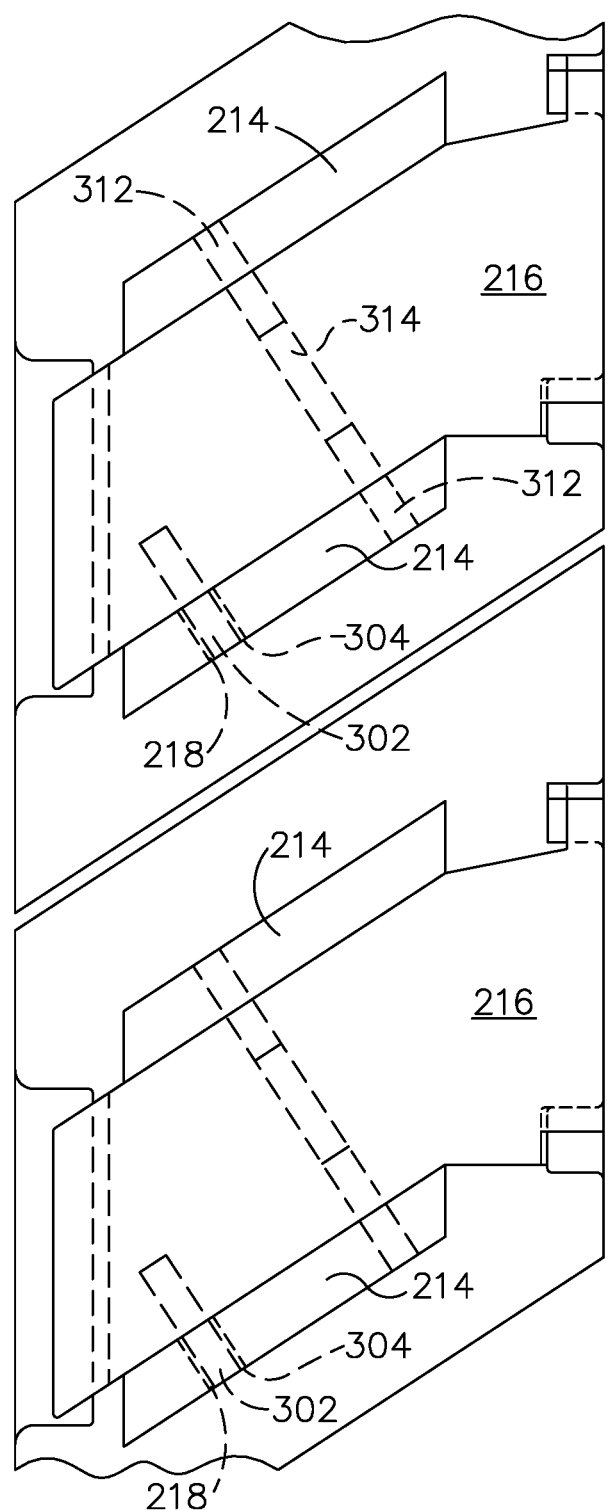

FIG. 4 is a radially inwardly looking view of the portion of gas turbine engine assembly 10 (shown in FIG. 1) in accordance with another embodiment of the present disclosure. In the embodiment shown in FIG. 4, three pins are used instead of four pins 302 as shown in FIG. 4. A pair of pins 312 may share a through bore 314 that extends through shank 214 and vane hanger 216. In this embodiment, only pin 302 is surrounded by slot 218. Pin 312, which extends from shank 214 through bore 314 to the other shank 214, sets the location of the hanger 216 relative to the shank 214. In operation, as thermal loads cause differential thermal growth between shank 214 and hanger 216, pin 302 can float within slot 218, allowing for movement in the direction of thermal growth (i.e., partially axial and partially circumferential) while simultaneously providing radial support. In the three-pin embodiment shown in FIG. 4, one shank 214 may have two pins (302 and 312) while the shank 214 on the other side has only one pin 312. On the side with two pins, pin 312 lines up via bore 314 with pin 312 on the opposite side. In this embodiment, pin 312 in shank 214 is linearly aligned via the through bore with pin 312 in shank 214 on the other side of the vane hanger. The other pin 302 on the side with two pins is surrounded by slot 218, while pin 312 is not surrounded by a slot.

Figure 5:
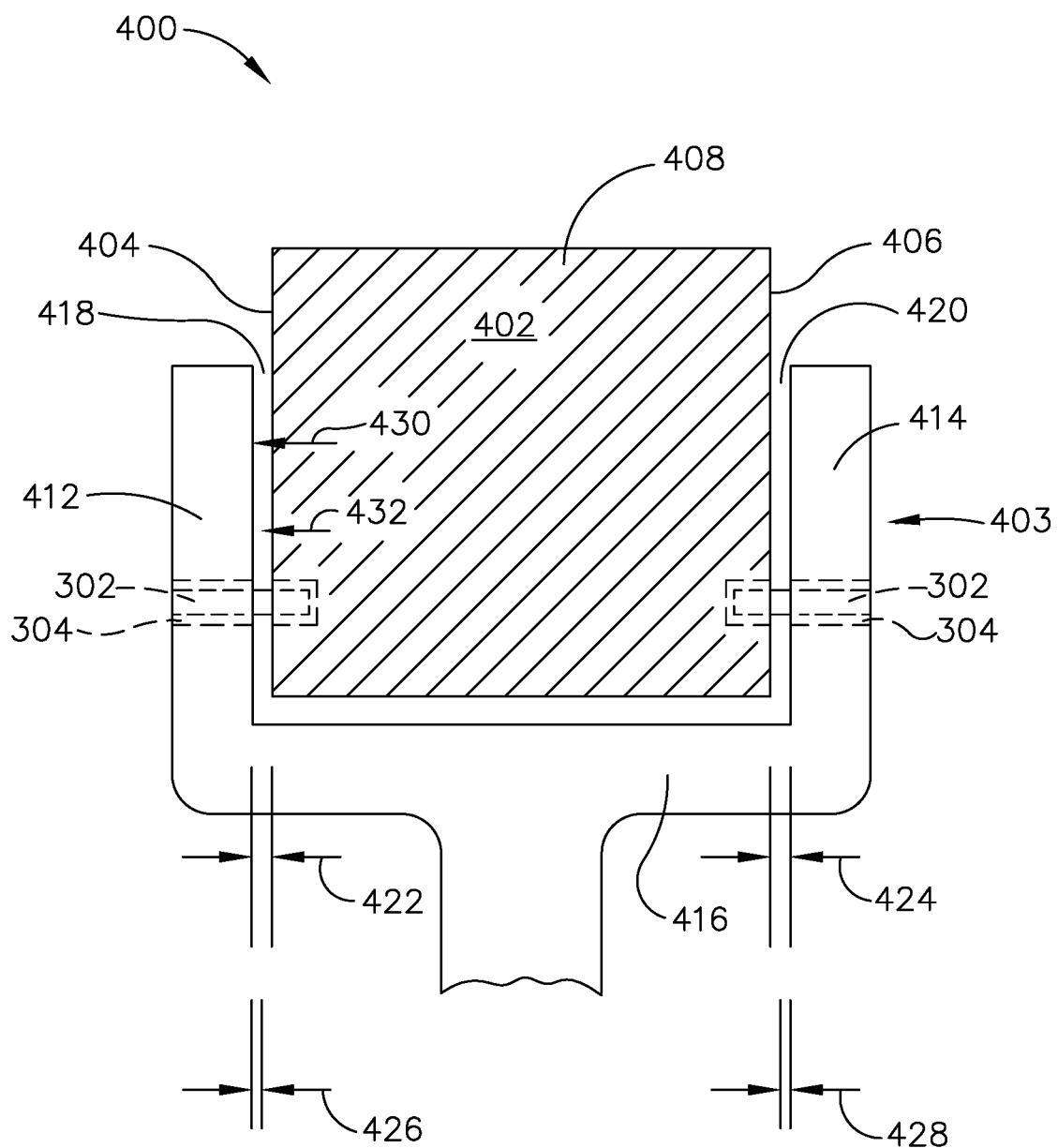

FIG. 5 is a side elevation view of a mechanical connecting joint 400 in accordance with an example embodiment of the present disclosure. In one embodiment mechanical connecting joint 400 is configured to join a first joint member 402, such as, but, not limited to vane hanger 216 to a second joint member 403. First joint member 402 is formed of a material having a first coefficient of thermal expansion (CTE) value, for example, a metal or metallic material. First joint member 402 includes a first sidewall 404, a second opposite sidewall 406, and a body 408 extending therebetween. Second joint member 403, such as, but, not limited to shank 214, is formed of a ceramic matrix composite (CMC) material having a second CTE value, the second CTE being less than the first CTE. Second joint member 403 is formed of a includes a first leg 412 facing first sidewall 404, a second leg 414 facing second sidewall 406, and a connecting member 416 extending between first leg 412 and second leg 414. A first gap 418 is defined between first joint member 402 and first leg 412. A second gap 420 is defined between first joint member 402 and second leg 414.

First gap 418 defines a first distance 422 between first joint member 402 and first leg 412 at a first temperature and a second distance 426 between first joint member 402 and first leg 412 at a second temperature, second distance 426 being different than first distance 422 and the second temperature being different than the first temperature. In the example embodiment, a change in distance between second distance 426 and first distance 422 is inversely related to a change in temperature between the second temperature and the first temperature. First joint member 402 exerts a first force 430 against first leg 402 at the first temperature and exerts a second force 432 against first leg 412 at the second temperature wherein second force 432 is greater than first force 430 and the second temperature is greater than the first temperature.

Figure 6:
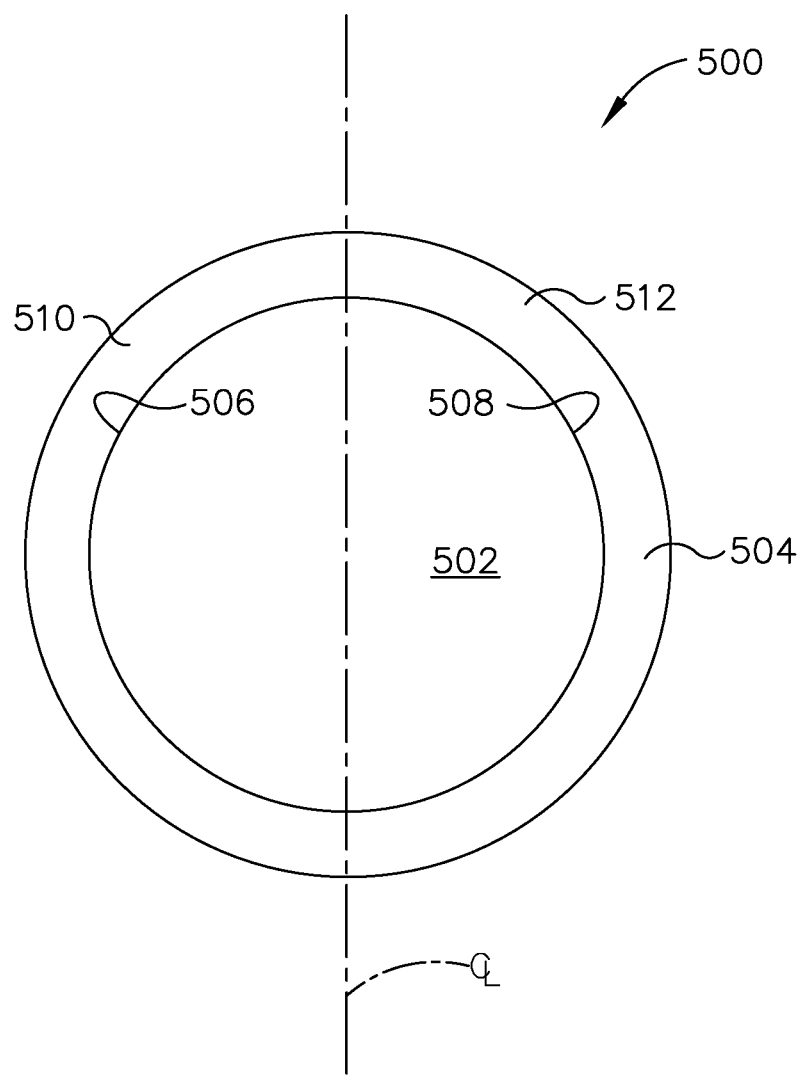

FIG. 6 is a plan view of a mechanical connecting joint 500 in accordance with another example embodiment of the present disclosure. In one embodiment mechanical connecting joint 500 is configured to join a first joint member 502 to a second joint member 504. In the example embodiment, a first sidewall 506 and a second opposite sidewall 508 are arcuately shaped and together form a circular cross-section. A first leg 510 and a second leg 512 are arcuately shaped and together form a circular cross-section complementary to first sidewall 506 and second sidewall 508. In various embodiments, mechanical connecting joint 500 is not circular, but rather may have other arcuate or square cross-sections, including, but not limited to, oval, oblong, elliptical, and the like.

Figure 7:
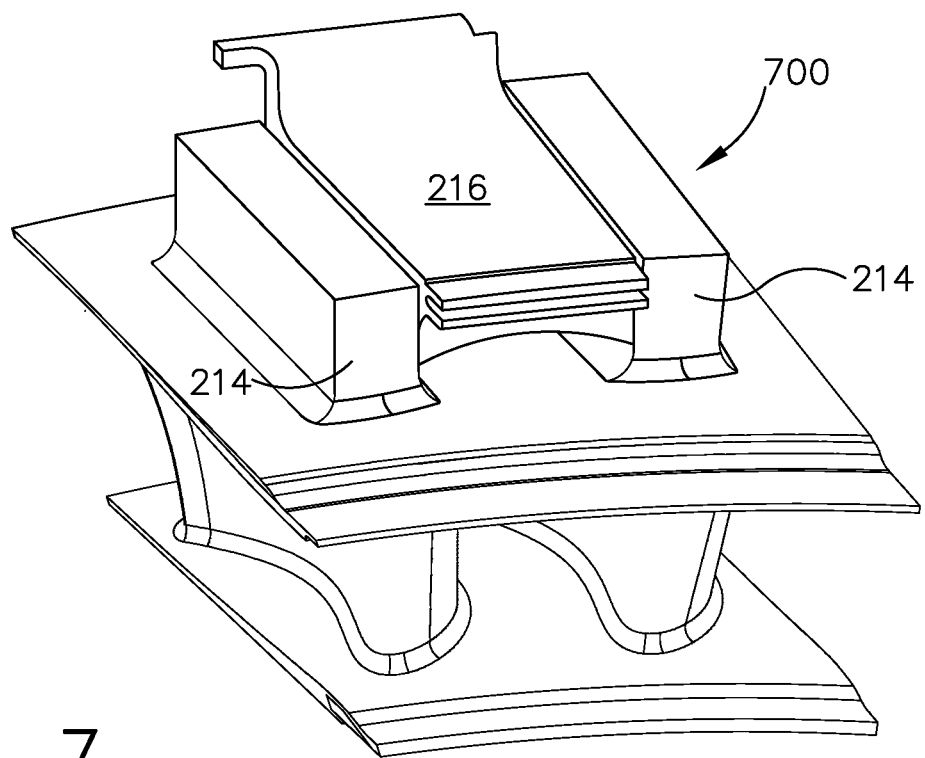

FIG. 7 is a perspective view of a cantilevered solid doublet CMC vane 700 including vane hanger 216, shank 214 and a radially inner portion 702 of vane hanger 216. The radially inner portion 702 is integrated into hanger 216 and extends in a circumferential direction, spanning the space between shank 214 on one side and shank 214 on the other side. The radially inner portion 702 may extend radially inward from hanger 216, all the way to platform 210. Alternately, the radially inner portion 702 may extend radially inward from hanger 216, but not all the way to platform 210 leaving a radial gap 704 therebetween, as illustrated in FIG. 7. The radially inner portion 702 may extend circumferentially from one shank 214 to the other shank 214 at a constant radial height. Alternately, the radially inner portion 702 may extend circumferentially from one shank 214 to the other shank 214 in an arched fashion with the largest radial gap 704 between the radially inner portion 702 and platform 210 occurring at the center of radially inner portion 702, as illustrated in FIG. 7. This embodiment allows the radially inner portion 702 to have a larger radial height at the interfaces with the shank 214 thereby increasing the surface area of the interfacing surfaces, while simultaneously decreasing the thickness of the radially inner portion 702 at the center of radially inner portion 702 to reduce the overall weight of the radially inner portion 702 of vane hanger 216.

An inner band 710 is shown in FIG. 7, the inner band being radially inward of airfoil 212. A radially outer surface 710A of the inner band 710 and a radially inner surface 210C of platform 210 respectively define a radially inner boundary and a radially outer boundary of a flow path of the gas turbine engine 10.

The shank 214 is oriented so that the longest dimension of shank 214 is substantially parallel to a chord of airfoil 212. As understood by a person or ordinary skill in the art, an airfoil chord is defined as a linear line connecting the leading edge of an airfoil to the trailing edge of the airfoil, for any given radial height of the airfoil. An airfoil chord can define a plane by extending the line defined by the chord radially inward and outward. The shank 214 may be oriented such that the length of the shank is oriented within 10 degrees of the chord of airfoil 212. Similarly, the shank 214 may be oriented such that the surface of shank 214 that interfaces with and contacts hanger 216 is oriented within 10 degrees of the plane defined by the chord of airfoil 212. In another embodiment, the shank 214 may be oriented within 7 degrees of the chord of airfoil 212. In another embodiment, the shank 214 may be oriented within 4 degrees of the chord of airfoil 212. In another embodiment, the shank 214 may be oriented within 1 degree of the chord of airfoil 212.

Figure 8:
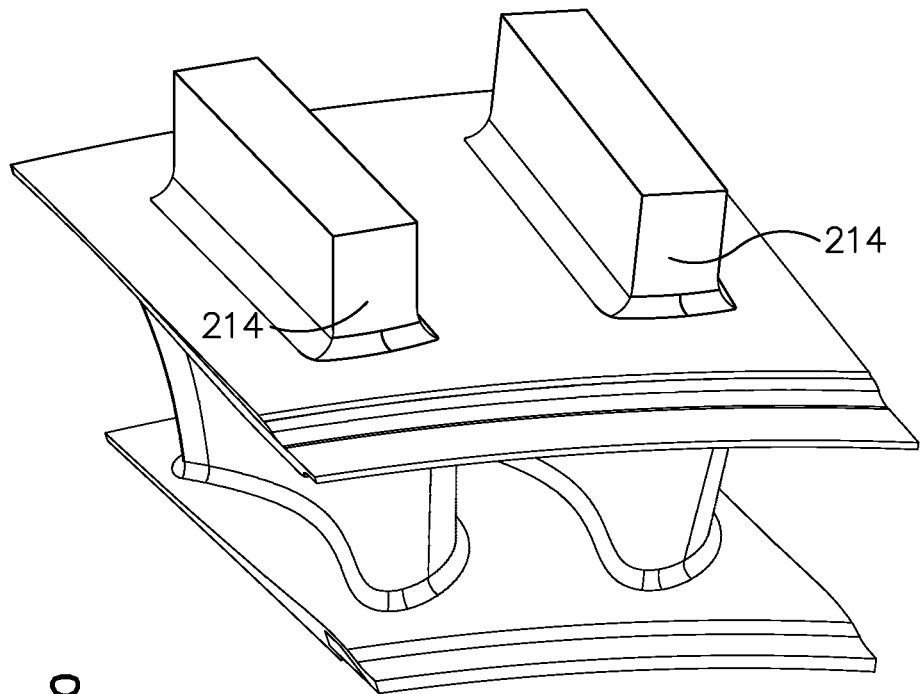

FIG. 8 is a perspective view cantilevered solid doublet CMC vane 700 showing only the CMC structures. As used herein, the term "doublet" is defined as a turbine vane segment with two airfoils. The unitary CMC vane segment shown in FIG. 8 includes shank 214, airfoil 212, platform 210 and inner band 710, formed together from CMC materials. As used herein, the term "unitary" means the CMC vane segment was formed from a continuous manufacturing process as one piece. Each of the CMC shank 214, CMC airfoil 212, CMC platform 210 and CMC inner band 710 were formed from CMC material simultaneously during a continuous manufacturing process, rather than being formed as individual CMC parts and then joined after the fact.

The CMC vane 700 of the present embodiments may be internally cooled or uncooled. The CMC vane 700 of the present embodiments may be included in a high-pressure turbine (HPT) section, an intermediate-pressure turbine section (IPT) or in a low-pressure turbine (LPT) section. For example, the CMC vane 700 may be the second stage of an LPT turbine with upstream turbine rotor stage 235 being part of a first LPT stage and aft turbine rotor stage 237 being part of second LPT stage.

The above-described embodiments of an apparatus and system of joining components provide a cost-effective and reliable means for providing a rigid determinate attachment through relatively simple geometry and materials. More specifically, the apparatus and systems described herein facilitate the use of proven turbine attachment and assembly methods, which facilitates conventional sealing methods as well. As a result, the apparatus and systems described herein facilitate maintenance and assembly of components that operate in high temperature environments in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine assembly, comprising:
  a casing;
  a plurality of bearings;
  a rotatable member comprising an axis of rotation and supported within the casing by the plurality of bearings;
  a vane hanger comprising a metal material having a first coefficient of thermal expansion (CTE), the vane hanger positioned radially outward from said rotatable member within said casing, said vane hanger comprising a radially outer portion fixedly coupled to said casing and a radially inner portion comprising a vane attachment; and a vane comprising a radially outer shank portion, the radially outer shank portion comprising a first leg and a second leg, each of said first and second legs extending radially outwardly on opposite sides of said vane attachment, each of said first and second legs comprising a ceramic matrix composite (CMC) material having a second CTE, wherein the radially outer shank portion comprises a slot allowing for thermal expansion in a direction along a length of the radially outer shank portion, wherein the vane attachment, the first leg and the second leg are angled such that their respective lengths are oriented at least partially in a circumferential direction and at least partially in an axial direction, and wherein each of the first and second legs comprises at least one pin attaching each of the first and second legs to the vane attachment, the at least one pin sized in a manner that allows the pin to be disposed and float within the slot allowing for movement of the vane hanger in the direction of thermal growth while providing radial support, such that a predetermined clamping load is achieved as the vane hanger out grows the radially outer shank portion.

2. The assembly of claim 1, wherein the first leg contacts the vane assembly at a first interfacing surface and the second leg contacts the vane attachment at a second interfacing surface such that the first and second interfacing surfaces are angled at least partially in a circumferential direction and at least partially in an axial direction.

3. The assembly of claim 1, wherein the vane attachment extends axially forward of each of the first and second legs.

4. The assembly of claim 1, wherein the vane attachment comprises a through bore wherein the at least one pin of the first leg and the at least one pin of the second leg are linearly aligned within the through bore.

5. The assembly of claim 1, wherein the vane hanger further comprises a radially inner portion extending in a circumferential direction from the first leg to the second leg, and wherein the radially inner portion extends radially inward from the vane hanger toward a radially outward surface of the vane.

6. The assembly of claim 1, wherein the vane further comprises an airfoil portion radially inward from the radially outer shank portion, the airfoil portion comprising an airfoil chord, wherein the first leg and the second leg are parallel with each other, and wherein the first leg and the second leg are substantially parallel to the airfoil chord.

7. A gas turbine engine assembly comprising:
a casing;
a plurality of bearings;
an upstream rotatable turbine stage supported within the casing by the plurality of bearings;
a downstream rotatable turbine stage supported within the casing by the plurality of bearings;
a vane hanger comprising a metal material having a first coefficient of thermal expansion (CTE), the vane hanger positioned radially outward from said rotatable member within said casing, said vane hanger comprising a radially outer portion fixedly coupled to said casing and a radially inner portion comprising a vane attachment; and a vane comprising a radially outer shank portion, the radially outer shank portion comprising a first leg and a second leg, each of said first and second legs extending radially outwardly on opposite sides of said vane attachment, each of said first and second legs comprising a ceramic matrix composite (CMC) material having a second CTE;

an upstream shroud;

an upstream shroud hanger radially outward of the upstream shroud, the upstream shroud hanger mechanically attached to an axially forward portion of the vane hanger;

a downstream shroud; and a downstream shroud hanger radially outward of the downstream shroud, the downstream shroud hanger mechanically attached to an axially aft portion of the vane hanger wherein the radially outer shank portion comprises a slot allowing for thermal expansion in a direction along a length of the radially outer shank portion;

wherein each of the first and second leg comprises at least one pin attaching each of the first and second legs to the vane attachment, the at least one pin sized in a manner that allows the at least one pin to be disposed and float within the slot allowing for movement of the vane hanger in the direction of thermal growth while providing radial support, such that a predetermined clamping load is achieved as the vane hanger outgrows the radially outer shank portion.

8. The assembly of claim 7, wherein the upstream shroud hanger comprises four hanger arms which intersect at a joint.

9. The assembly of claim 7, wherein the upstream shroud defines a box shroud, the box shroud comprising four walls which form a rectangular cross section.

10. The assembly of claim 8, wherein the axially forward portion of the vane hanger is mechanically attached to one hanger arm of the four hanger arms.

11. The assembly of claim 8, wherein a second hanger arm of the four hanger arms extends radially outward from the joint and attaches the upstream hanger to the casing.

12. The assembly of claim 8, wherein a third hanger arm of the four hanger arms extends axially forward from the joint and attaches to a radially outward wall of the upstream shroud, and wherein the vane attachment, the first leg and the second leg are angled such that their respective lengths are oriented at least partially in a circumferential direction and at least partially in an axial direction.

13. The assembly of claim 12, wherein the vane hanger further comprises a radially inner portion extending in a circumferential direction from the first leg to the second leg; and wherein the vane attachment extends axially forward of each of the first and second legs.

14. The assembly of claim 7, wherein an aft portion of the downstream shroud hanger is connected to the downstream shroud by a C-shaped bracket, the C-shaped bracket providing radial support to the downstream shroud.

15. A unitary CMC vane segment for a gas turbine engine comprising:
a radially outer shank portion, the radially outer shank portion comprising a first leg and a second leg, each of said first and second legs extending radially outwardly on opposing sides of the vane segment, each of the first and second legs comprising a ceramic matrix composite (CMC) material;
a platform radially inward from the radially outer shank portion, the platform comprising a ceramic matrix composite (CMC) material;
at least one airfoil, the at least one airfoil extending radially inward from the platform, the at least one airfoil comprising a ceramic matrix composite (CMC) material; and
an inner band, the inner band radially inward from the at least one airfoil, the inner band comprising a ceramic matrix composite (CMC) material;
wherein the radially outer shank portion, the platform, the inner band and the at least one airfoil form a solid CMC vane segment; wherein the radially outer shank portion comprises a slot allowing for thermal expansion in a direction along a length of the radially outer shank portion; and
wherein each of the first and second leg comprises at least one pin attaching each of the first and second legs to a vane attachment, the at least one pin sized in a manner that allows the pin to be disposed and float within the slot allowing for movement of a vane hanger in the direction of thermal growth while providing radial support, such that a predetermined clamping load is achieved as the vane hanger outgrows the radially outer shank portion.

16. The unitary CMC vane segment of claim 15, wherein the radially outer shank portion, the platform, the at least one airfoil and the inner band are formed together in one continuous process forming the unitary CMC vane segment.

17. The unitary CMC vane segment of claim 16, wherein the unitary CMC vane segment further comprises a cantilevered CMC doublet vane including solid airfoils and integral CMC flow path end walls.

18. The unitary CMC vane segment of claim 17, wherein the first leg and the second leg are angled such that their respective lengths are oriented at least partially in a circumferential direction and at least partially in an axial direction.

\* \* \* \* \*